(12) United States Patent
Bowman et al.

(10) Patent No.: US 8,265,191 B2
(45) Date of Patent: Sep. 11, 2012

(54) RECEIVER FOR OBJECT LOCATING AND TRACKING SYSTEMS AND RELATED METHODS

(75) Inventors: Douglas C. Bowman, Capitola, CA (US); Huong M. Hang, San Jose, CA (US)

(73) Assignee: Zebra Enterprise Solutions Corp., Oakland, CA (US)

( * ) Notice: Subject to any disclaimer, the term of this patent is extended or adjusted under 35 U.S.C. 154(b) by 642 days.

(21) Appl. No.: 11/696,202

(22) Filed: Apr. 4, 2007

(65) Prior Publication Data

US 2007/0248180 A1    Oct. 25, 2007

Related U.S. Application Data

(60) Provisional application No. 60/745,110, filed on Apr. 19, 2006.

(51) Int. Cl.
*H04L 27/14* (2006.01)
(52) U.S. Cl. .......................................... 375/272; 375/334
(58) Field of Classification Search .................. 375/259, 375/271, 272, 316, 334, 269, 320, 322
See application file for complete search history.

(56) References Cited

U.S. PATENT DOCUMENTS

| | | | | |
|---|---|---|---|---|
| 4,170,764 A * | 10/1979 | Salz et al. | ............ | 332/100 |
| 5,451,958 A * | 9/1995 | Schuermann | ............ | 342/42 |
| 5,517,194 A | 5/1996 | Carroll et al. | ............ | 342/50 |
| 5,995,046 A | 11/1999 | Belcher et al. | ............ | 342/450 |
| 6,121,926 A | 9/2000 | Belcher et al. | ............ | 342/450 |
| 6,127,976 A | 10/2000 | Boyd et al. | ............ | 342/463 |
| 6,349,116 B1 | 2/2002 | Hash et al. | ............ | 375/258 |
| 6,380,894 B1 | 4/2002 | Boyd et al. | ............ | 342/450 |
| 6,434,194 B1 * | 8/2002 | Eisenberg et al. | ............ | 375/238 |
| 6,476,719 B2 | 11/2002 | Belcher et al. | ............ | 340/572.1 |
| 6,542,114 B1 | 4/2003 | Eagleson et al. | ............ | 342/357.07 |
| 6,593,885 B2 | 7/2003 | Wisherd et al. | ............ | 342/463 |
| 6,626,253 B2 * | 9/2003 | Hahn et al. | ............ | 175/48 |
| 6,657,586 B2 | 12/2003 | Turner | ............ | 342/357.07 |
| 6,738,435 B1 * | 5/2004 | Becker | ............ | 375/334 |
| 6,812,839 B1 | 11/2004 | Belcher et al. | ............ | 340/572.1 |
| 6,853,687 B2 | 2/2005 | Harrington et al. | ............ | 375/259 |
| 6,892,054 B2 | 5/2005 | Belcher et al. | ............ | 455/63.1 |
| 6,987,744 B2 | 1/2006 | Harrington et al. | ............ | 333/189 |
| 7,046,657 B2 | 5/2006 | Harrington et al. | ............ | 370/350 |
| 2002/0063622 A1 | 5/2002 | Armstrong et al. | ............ | 340/10.31 |
| 2002/0181565 A1 | 12/2002 | Boyd et al. | ............ | 375/152 |
| 2005/0099269 A1 | 5/2005 | Diorio et al. | ............ | 340/10.51 |
| 2006/0077041 A1 | 4/2006 | Chan et al. | ............ | 340/10.4 |
| 2006/0176989 A1 * | 8/2006 | Jensen | ............ | 375/350 |

FOREIGN PATENT DOCUMENTS

WO    01/67043    9/2001

* cited by examiner

*Primary Examiner* — Kevin M Burd (74) *Attorney, Agent, or Firm* — Alston & Bird LLP (57) ABSTRACT

A communications system, such as part of a real-time location system, includes a transmitter that can be part of a location processor, tag emission reader or tag interrogator that generates a frequency shift key (FSK) modulated wireless communication signal representative of digital data and transmits the communications signal over a wireless communications channel. A receiver such as incorporated within a tag transceiver used in the real-time location system receives the FSK modulated communication signal. The receiver includes a circuit for calculating the magnitude of low and high tones of the FSK modulated communication signal and a threshold for amplitude shift keyed (ASK) channel data and FSK channel data to derive the digital data even in the presence of on-tone jammers in the communications channel.

25 Claims, 5 Drawing Sheets

RECEIVER FOR OBJECT LOCATING AND TRACKING SYSTEMS AND RELATED METHODS

RELATED APPLICATION

This application is based upon prior filed provisional application Ser. No. 60/745,110 filed Apr. 19, 2006.

FIELD OF THE INVENTION

This invention relates to object locating and tracking systems, and more particularly, this invention relates to field coupling to RF-burst transmitting tags having an associated receiver to receive data.

BACKGROUND OF THE INVENTION

Commonly assigned U.S. Pat. Nos. 6,349,116; 6,476,719; 6,434,194; 6,812,839; and 6,853,687, the disclosures which are hereby incorporated by reference in their entirety, disclose different types of compact transmitter units such as contained in a "tracking" tag (radio frequency (RE) tag transmitter), which is typically affixed to an object or asset to be tracked. These tags are operative with a digital detector/demodulator unit used for varying the "blinking" rate and other functions.

These patents describe a location system in which tag transmitters are configured to transmit or "blink" repeatedly for a short duration a wideband, spread spectrum pulse of RF energy that is encoded with the identification of an associated object and other information stored in a tag memory. Tag emission readers are geographically distributed within and/or around an asset management environment that contains the assets or objects, whose locations are monitored on a continuous basis and repeated to an asset management database, which can be accessible by a computer workstation or personal computer. The tag emission readers monitor the asset management environment for RE signals emitted from tags that are affixed to the objects to be tracked.

The blinks are bursts of RF energy emitted by the tags and monitored by the readers, which are installed at fixed and relatively unobtrusive locations within and/or around the perimeter of the environment being monitored, such as doorway jams, ceiling support structures and the like. A processor is connected to each tag emission reader and correlates the spread spectrum RF signals received from a tag with a set of spread spectrum reference signal patterns to determine which signals are first-to-arrive signals. A location processor is connected to tag emission readers and uses time-of-arrival differentiation of the detected first-to-arrive transmissions. The location processor uses a multi-lateration algorithm and locates the tagged object on a resolution as defined as about 10 feet.

It is possible to place short range, magnetic field proximity-based, tag-programming "pingers" at a respective location of the monitored environment, such as at a doorway through which a tag passes. This tag-programming "pinger" emits an AC magnetic field encoded with information, for example, programming information, data or "stimulus" that is coupled to any tag passing through that region. This information could be a reprogramming message this is operative to cause the tag to begin blinking at an increased rate for a brief period of time to alert the tracking system of the presence of the tag in that particular region. Alternatively, the tag transceiver could be modified to incorporate a magnetic field sensor that enables the tag to respond to the encoded AC magnetic field generated by the "pinger." In one sspect, this "pinger" can generate a non-propagating AC magnetic field modulated with a frequency shift keyed (FSK) modulation signals representative of digital data to be transmitted to the tag.

As disclosed in some of the incorporated by reference patents, a receiver includes an LC tank detector circuit and magnetic field-sensing coil in parallel with a capacitor. The LC tank circuit resonates at a frequency between the two FSK frequencies used by the transmitter. The resonator detector is coupled to a sense amplifier that amplifies the voltage produced by the tank circuit for a desired receiver sensitivity. It buffers the detected voltage to a level used by a digital receiver-demodulator.

The digital receiver can be referenced to a clock frequency that corresponds to the difference between the two frequencies of the selected FSK modulation pair. In one aspect, the receiver contains two signal buffer paths, which operate on alternate sample periods one-half the period of the received data symbol rate, such that at least one of the two buffer paths will not be sampling data during transitions in the received FSK frequency. This demodulated data is buffered so that it may be clocked out to control circuitry in the tag. The tag can include an oscillator coupled to a variable pseudorandom (PN) pulse generator and other circuits as described in the above-identified and incorporated by reference patents.

The receivers in such tags and systems use frequency shift keying based circuitry, which often includes an FSK discriminator. If this type of receiver is used, however, receiver could fail to function in the presence of on-tone jammers.

SUMMARY OF THE INVENTION

A communications system, such as part of a real-time location system, includes a transmitter that can be part of a location processor, tag emission reader or tag interrogator that generates a frequency shift key (FSK) modulated wireless communication signal representative of digital data and transmits the communications signal over a wireless communications channel. A receiver such as incorporated within a tag transceiver used in the real-time location system receives the FSK modulated communication signal. The receiver includes a circuit for calculating the magnitude of low and high tones of the FSK modulated communication signal and a threshold for amplitude shift keyed (ASK) channel data and FSK channel data to derive the digital data even in the presence of on-tone jammers in the communications channel.

A digital-to-analog (A/D) converter receives and converts the FSK modulated communications signal into an analog signal. A bandpass filter is connected to the A/D converter and operative as an anti-aliasing filter.

An Inphase/Quadrature (I/Q) matched filter circuit processes low and high tones and is formed as low tone I and Q matched filters and high tone I and Q matched filters. An adder circuit is connected to the I/Q matched filter circuit for calculating the magnitude of low and high tones. The compare circuit receives the result of the adder circuit to generate FSK channel data. In one aspect, the receiver includes a peak/hold and divide circuit that receives data from the adder circuit. The receiver includes an encoder for Manchester encoding the ASK and FSK channel data such that known signal segments are valid when expressed in Manchester periods.

A method is also set forth.

BRIEF DESCRIPTION OF THE DRAWINGS

Other objects, features and advantages of the present invention will become apparent from the detailed description of the invention, which follows when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The system, receiver and method, in accordance with a non-limiting example of the present invention, provides an FSK receiver that can function in the presence of one tone jammers by automatically switching to an amplitude shift keyed (ASK) mode receiver on either of two FSK tones. This provides greater efficiency in many location systems.

Figure 1:
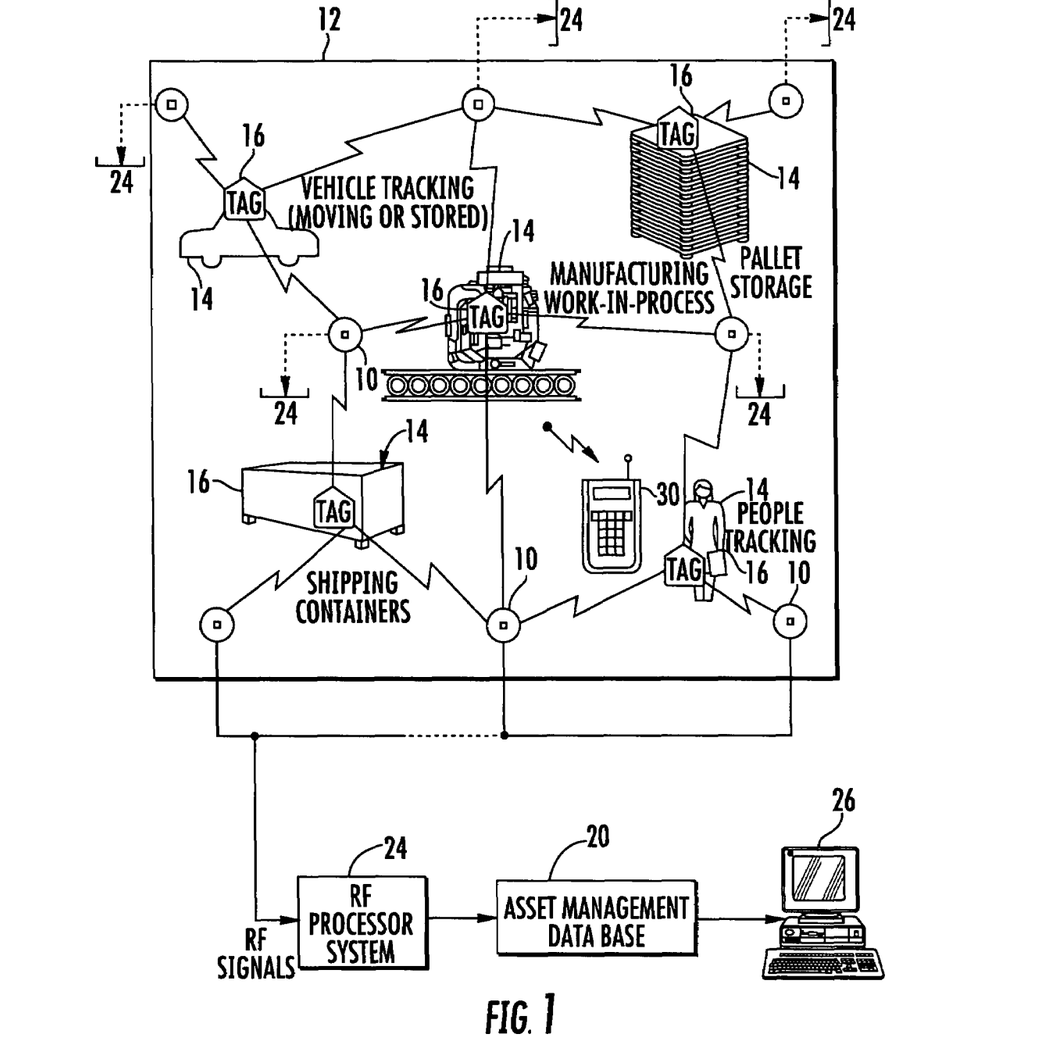
FIG. 1 is a high-level diagram illustrating a general architecture of a tagged object tracking and location system that can be used with the receiver in accordance with a non-limiting example of the present invention.
Figure 2:
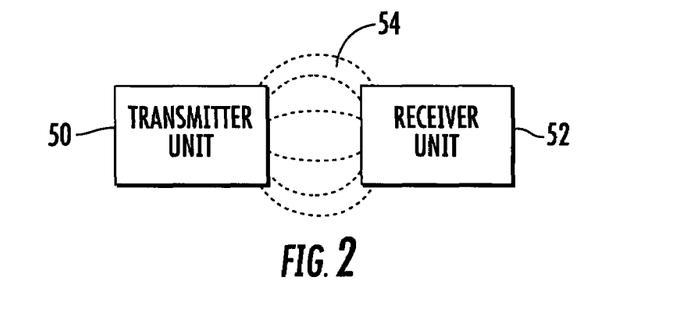
FIG. 2 is a high-level block diagram showing an overall system configuration of a frequency shift keyed (FSK) non-propagating magnetic field-based communication system such as used in accordance with a non-limiting example of the present invention.

There now follows a brief description of a location system relative to FIGS. 1 and 2, which can be used with the receiver in accordance with a non-limiting example of the present invention.

The general architecture of a radio tagged object location system described in the above-referenced patents is diagrammatically shown in FIG. 1. The system includes a plurality of tag emission readers 10 geographically distributed within and/or around an asset management environment 12. This environment contains a plurality of objects/assets 14, whose locations are to be monitored on a continuous basis and reported to an asset management database 20, which is accessible by way of a computer workstation or personal computer 26. Each of the tag emission readers 10 monitors the asset management environment for RF emissions from one or more RF-transmitter-containing tags 16 that are affixed to the objects 14. Each tag's transmitter is configured to repeatedly transmit or "blink" a very short duration, wideband (spread spectrum) pulse of RF energy, which is encoded with the identification of the object and other information that may be stored in a tag memory.

These blinks or bursts of RF energy emitted by the tags are monitored by the readers 10, which are installed at fixed, and relatively unobtrusive locations within and/or around the perimeter of the environment being monitored, such as doorway jams, ceiling support structures, and the like. The output of each tag reader 10 is coupled to an associated reader processor. The reader processor correlates the spread spectrum RF signals received from a tag with a set of spread spectrum reference signal patterns, to determine which spread spectrum signals received by the reader is a first-to-arrive RF spread spectrum signal burst transmitted from the tag.

The first-to-arrive signals extracted by the reader output processors are forwarded to an object location processor within the processing subsystem 24. Using time-of-arrival differentiation of the detected first-to-arrive transmissions, the object location processor executes a prescribed multilateration algorithm to locate (within a prescribed spatial resolution (e.g., on the order of ten feet) the tagged object of interest.

FIG. 2 diagramatically illustrates an overall system configuration of a frequency shift keyed non-propagating magnetic field-based communication system that includes a transmitter unit 50 and a receiver unit 52 that are linked together by a non-propagating magnetic field 54 generated and FSK-modulated by the transmitter unit and detected and demodulated by the receiver unit.

In their normal mode of use, the tags exhibit a prescribed operational functionality, such as transmitting or "blinking" an RF signal at a relatively slow repetition rate. The use of a relatively slow blink rate is due to the fact that most of the objects being tracked do not move frequently. There may be occasions, however, where it is desired to change the operation of or otherwise communicate information to a tag, such as stopping the tag from blinking or causing it to start blinking, or to transmit additional data, such as that acquired from optional sensors or a data bus.

As another illustration, there are times when the objects to which the tags are attached are moved and may pass through one or more regions of the monitored environment where communications with the tags are desired. For example, the monitored environment may contain "increased sensitivity" regions (such as doorways and the like) where more frequent tag transmissions are desired, in order to ensure that any objects passing therethrough will be readily tracked.

As described in the above-identified patents and published applications, a tag-reprogramming function is readily achieved by placing an arrangement of one or more relatively short range, modulated magnetic field proximity-based, tag-programming generators or "pingers" at a respective location of the monitored environment that is proximate to a region (such as a doorway) through which a tag may pass. This tag-programming pinger arrangement is operative to emit a non-propagating, AC magnetic field, which is sensed by the tag and used to controllably prompt (or program) the tag to take some action. As a non-limiting example, the tag reprogramming field may be used to cause the tag to begin blinking immediately at an increased rate for a relatively brief period of time, so as to alert the tag-tracking system of the presence of the tag in the region of interest.

This magnetic field in some systems is modulated or encoded with frequency shift keyed (FSK) encoding signals representative of digital data to be transmitted to the tag, using an FSK-encoded magnetic field based communication scheme of the type detailed in the above-identified patents. The use of an FSK-encoded AC magnetic field using operational frequencies typically less than a few hundred KHz allows a large amount of data to be rapidly communicated to the tag.

In accordance with a non-limiting example of the present invention, the FSK receiver includes a pair of I/Q matched filters for the two tones of a frequency-shift keying (FSK) signal. A digital discriminator can determine the tone by comparing the computed amplitude of the output of the two filters. This provides a robust system and method of determining which tone is present at any given time.

In the presence of an on-tone jammer of sufficient power, this comparison will fail to yield reliable results. Since the system can calculate the amplitude of each filter output, the system can also use each tone individually as an amplitude-shift keying (ASK) signal. The desired signal will be either on tone, which would produce a relatively large amplitude, or the signal is at the other tone, which would produce a small amplitude. With a simplistic peak hold on the calculated amplitude, a threshold can be calculated and used for comparing to the ASK tone.

A priority scheme is used to select the data stream from the FSK channel first, then ASK tone 0, and finally ASK tone 1. Selection of the appropriate data stream is made by checking each channel's output for any valid Manchester data that is at a coherent data rate to the expected signal.

The following logic example in pseudo-code describes the stream selection:

```
if (FSK_Channel_Valid_Data)
    if (Amplitude_Tone_0 > Amplitude_Tone_1)
        output = 0;
    else
        output = 1;
else if (ASK_Channel_0_Valid_Data)
    if (Amplitude_Tone_0 > Threshold_Tone_0)
        output = 0;
    else
        output = 1;
else if (ASK_Channel_1_Valid_Data)
    if (Amplitude_Tone_1 > Threshold_Tone_1)
        output = 1;
    else
        output=0;
else
    abort receiver . . . no valid signal.
```

Figure 3:
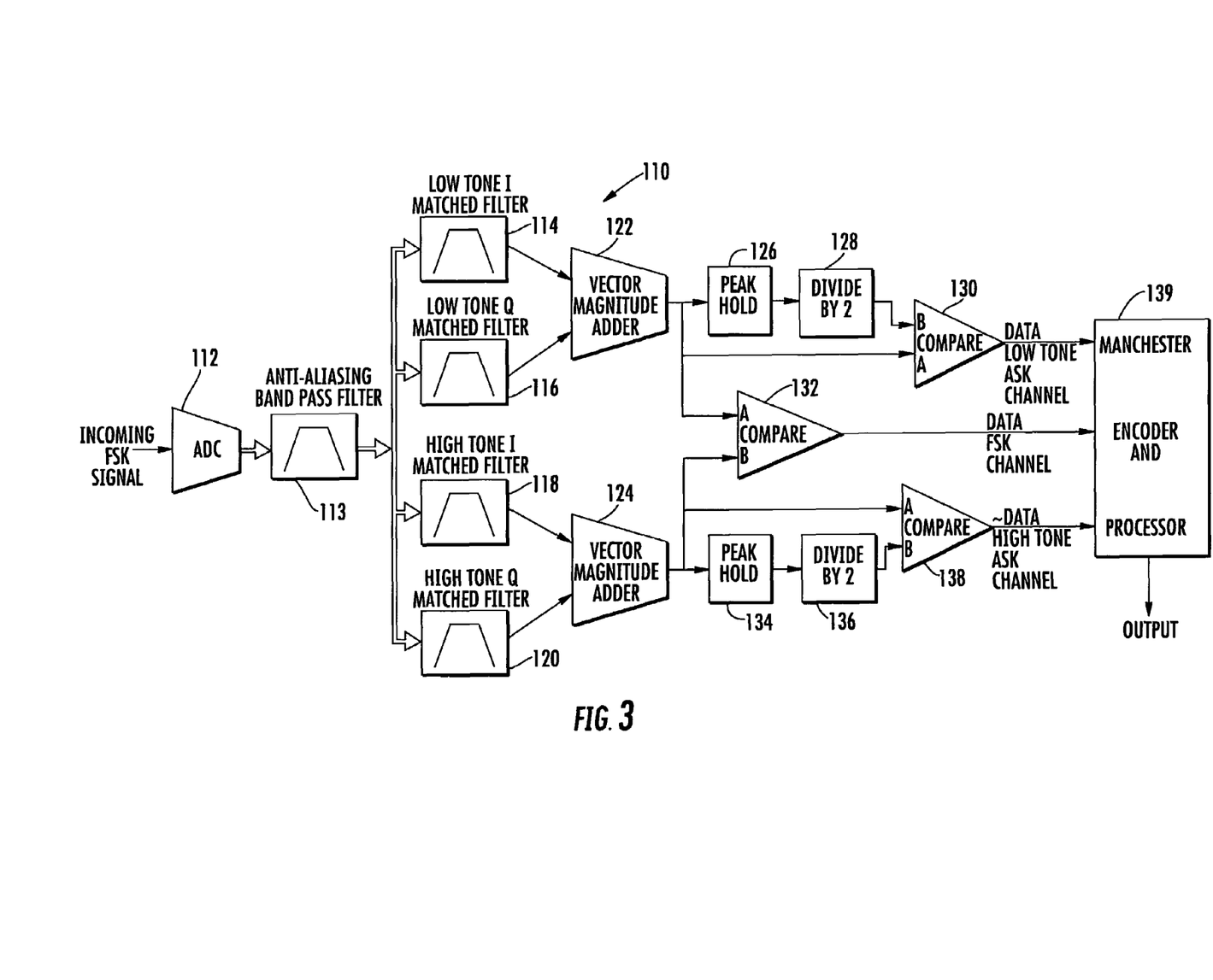
FIG. 3 is a block diagram of a receiver that can be used in accordance with a non-limiting example of the present invention.

FIG. 3 is a block diagram showing basic components of the FSK receiver 110 in accordance with a non-limiting example of the present invention. As illustrated, the FSK receiver includes an analog-to-digital converter (ADC) 112 that converts the incoming FSK signal to its digital component and passes its output through an anti-aliasing bandpass filter 113. The output from this filter 113 passes into a low tone In phase (I) match filter 114, low tone quadrature phase (Q) match filter 116, high tone In phase match filter 118, and high tone quadrature phase match filter 120.

Respective vector magnitude adders 122, 124 receive the respective signals from the low tone match filters 114, 116 and high tone match filters 118, 120. A peak hold circuit 126 and divide-by-two circuit 128 receive a signal from the vector magnitude adder and compare circuit 130 and compare circuit 132. A data output as a low tone amplitude-shift keying (ASK) channel is output from the compare circuit 130, which also receives a signal input directly from the vector magnitude adder and the signal input from the divide-by-two circuit 128. The compare circuit 132 also receives a signal from the vector magnitude adder 124 to produce a data FSK channel. A second series of a peak hold circuit 134 and divide-by-two circuit 136 passes a signal into a compare circuit 138, which also receives a signal from the vector magnitude adder 124 and produces the data high tone ASK channel. A Manchester encoder and processor circuit 139 receives and processes the ASK and FSK channel data as illustrated.

The anti-aliasing bandpass filter 113 can be operative as an infinite impulse response (IIR) filter. It can have an impulse response function that is usually non-zero over an infinite length of time. For example, a simple analog IIR filter could be an RC filter manufactured from a single resistor feeding into a node shared with a single capacitor. There could be recursive filters. Different filters that could possibly be used include Chebyshev, Butterworth and Bessel filters, as non-limiting examples. Finite impulse response filters could also be used.

It should also be understood that frequency-shift keying uses frequency modulation in which the modulating signal shifts the output frequency between predetermined values. For example, the instantaneous frequency can be shifted between two discrete values termed the mark frequency and the space frequency. This could be a non-coherent form of FSK. A coherent form of FSK could exist in which there is no phase discontinuity in the output signal. Minimum frequency-shift keying or minimum-shift keying can be a more spectrally efficient form of coherent frequency-shift keying and can be used.

The amplitude-shift keying (ASK) represents digital data as variations in the amplitude of a carrier wave. For example, ASK can operate as a switch using the presence of a carrier wave to indicate a binary 1 and an absence of the carrier wave to indicate a binary 0, i.e., on-off keying.

It should also be understood that Manchester code is also referred to as biphase encoding and can be unipolar or bipolar. A binary 1, for example, could be transmitted as a positive pulse for about one-half of a bit interval and then as a negative pulse for the remaining part of the bit interval. A binary 0 could be transmitted as a negative pulse for the first half of the bit interval and a positive pulse for the second half of the bit interval. Thus, a transition can occur at the center of each 0 or 1 bit to make clock recovery acceptable. Depending on the state of a signal, a Manchester code could have a transition at the beginning of the period and at the middle of each bit period. Manchester encoding can be a special case of binary phase shift keying, where the data to be transmitted controls the phase of a square wave carrier that is at the data rate and frequency.

The incoming signal is a frequency shift keyed (FSK) modulated signal. The low tone can be used for a logic 1, and the high tone used for a logic 0. The system can pass the signal through an analog to digital converter (ADC), which has an output fed into the digital IIR filter used for anti-aliasing. The IIR filter can be used since undersampling the signal in the matched filters to save power and gate count. The signal is passed simultaneously through four (4) matched filters, low tone I/Q and high tone I/Q. Vector addition occurs on the I and Q outputs to calculate the magnitude of the low tone and of the high tone. These two outputs are compared directly to generate the FSK channel data. The magnitude outputs for both the low and high tone are also run into peak-hold circuits and into divide-by-two circuits to set a threshold for the amplitude shift keyed (ASK) channels. The magnitudes of the channels is compared to the threshold for that channel to generate the ASK channel data outputs. The high tone ASK channel will produce inverted data.

The system establishes the timing of the incoming signal, and can determine the validity of the data for all three channels. The data can be Manchester encoded such that only the following signal segments are valid when expressed in terms of Manchester periods:

Start Sync=111000
Stop Sync=000111
Data 1=10
Data 0=01

All messages can begin with a Start Sync, then have N data bits, and end with a stop sync. In some signaling protocols, the end of one message can be continuous with the start of the next message. Knowing these facts, by checking the time between transitions, the system can determine if the signal is valid.

Figure 4:
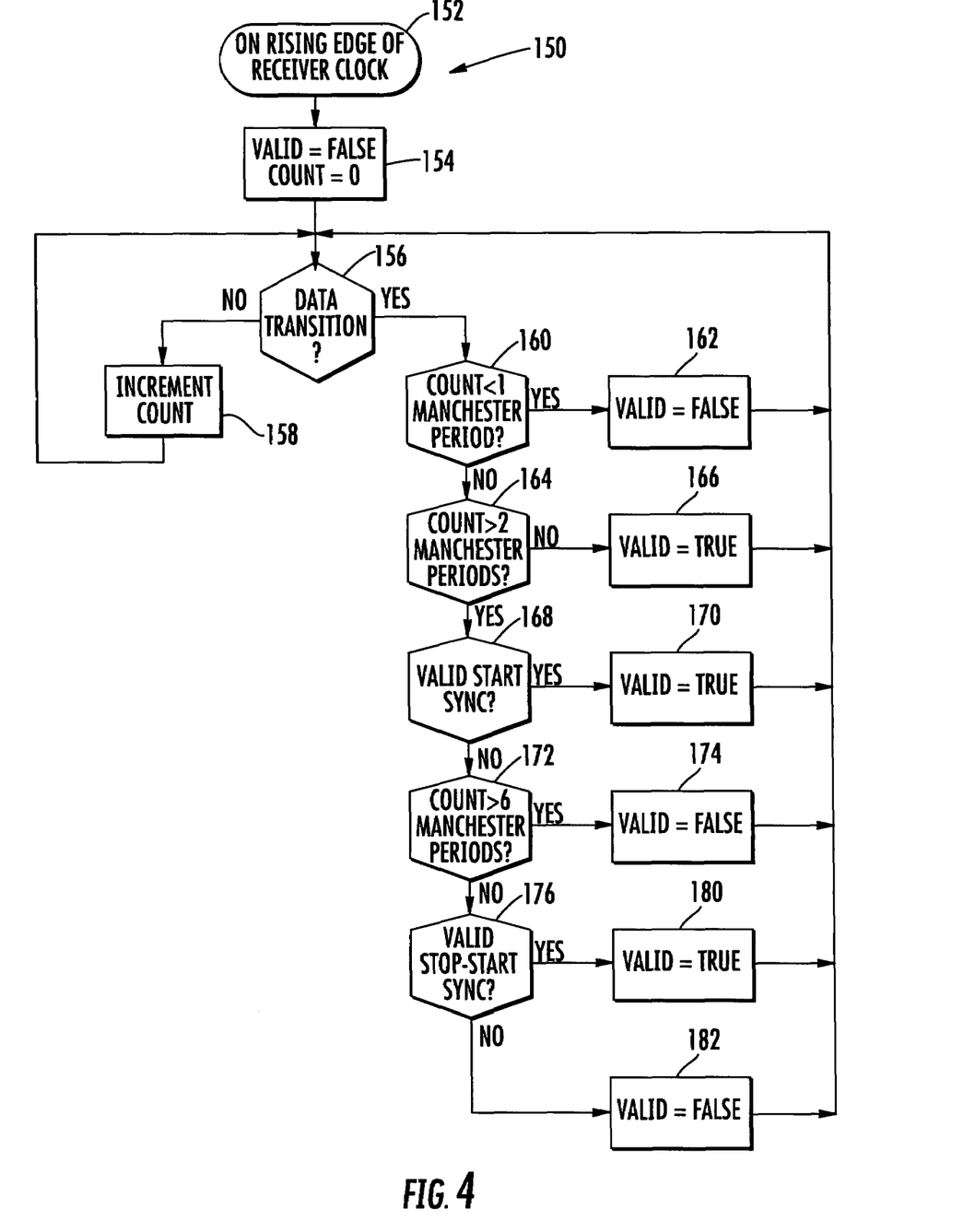
FIG. 4 is a high-level flowchart of the method of operation of the receiver shown in FIG. 3 in accordance with a non-limiting example.

The high-level flow diagram in FIG. 4 describes the process. Data typically will never have more than two (2) consecutive periods of either high or low. Start and Stop sync patterns are known and can be checked if the transition time exceeds to Manchester periods.

FIG. 4 is a high-level flowchart 150 illustrating basic steps for operation of the receiver in accordance with a non-limiting example of the present invention. The rising edge of a receiver clock is determined (block 152), and if valid equals false, the count equals zero (block 154). A determination is made whether a data transition occurs (block 156), and if not, an increment account occurs (block 158). If yes, then a determination is made whether the count is less than one for the Manchester period (block 160), and if yes, then a valid equal false determination is made (block 162). The loop back occurs to the increment count as illustrated.

If the count is not less than one for the Manchester period, then a determination is made whether the count is greater than two for the Manchester periods (block 164). If not, then the valid equals true determination is made (block 166). If the count is greater than two, then a valid start sync is determined (block 168), and if yes, then a valid equals true determination is made (block 170). If the count is greater than six for the Manchester periods (block 172), then a valid equals false determination is made (block 174). A determination is made whether a valid Stop-Start synchronization occurs (block 176), and if yes, then a valid equals true determination is made (block 180). If not, then a valid equals false determination is made (block 182).

For purposes of description, the type of location circuits, algorithm, and associated functions that can be modified for use with the present invention are set forth in the incorporated by reference patents. For purposes of description, FIGS. 5 and 6 describe representative examples of circuit architectures that can be modified for use, in accordance with non-limiting examples of the present invention, and used in the receiver 10 architecture associated therewith.

Figure 5:
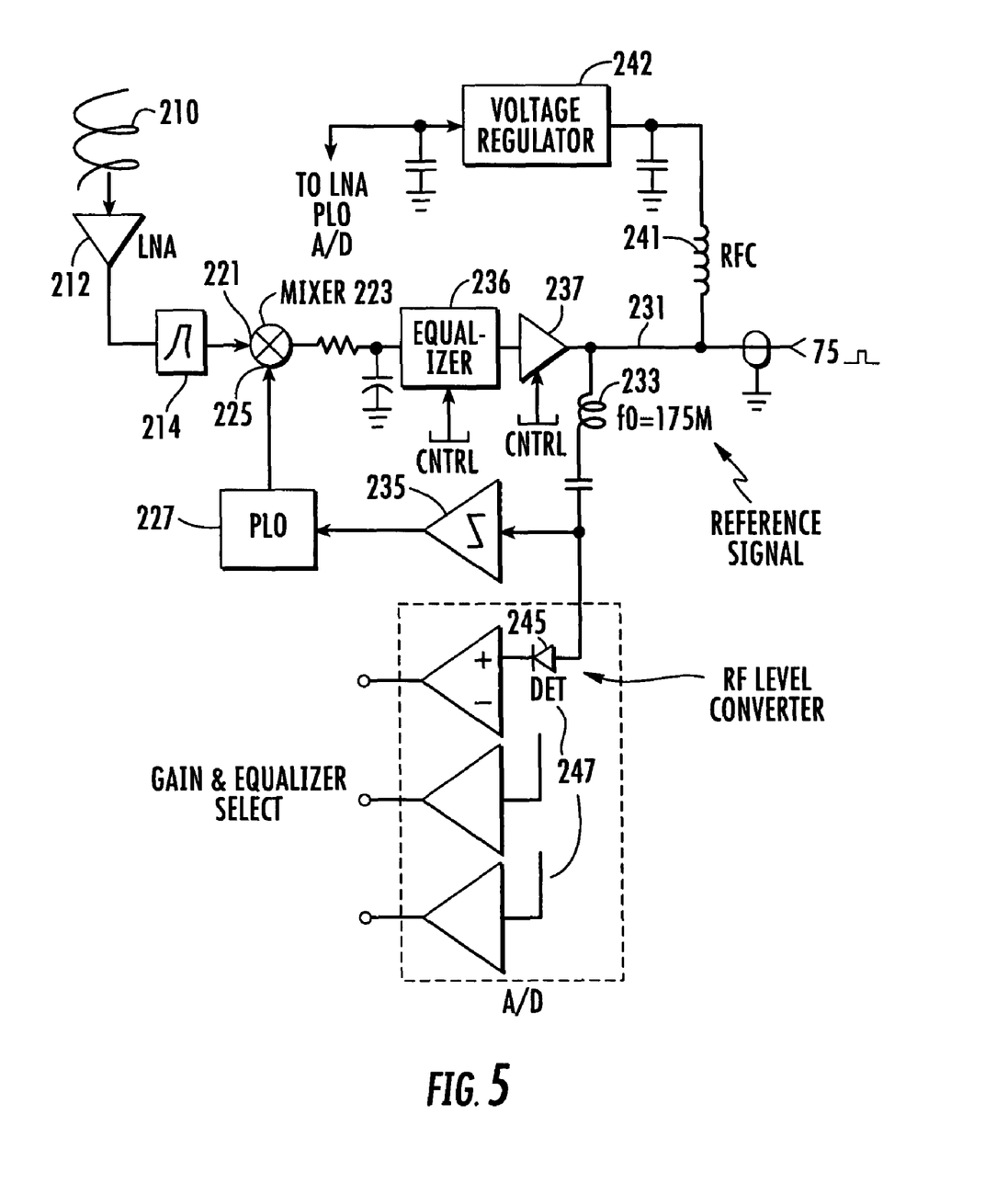
FIG. 5 is a high-level block diagram of one example of the circuit architecture that can be modified for use as part of a processor for determining first-to-arrive signals and used with the tag and receiver in accordance with a non-limiting example of the present invention.

FIG. 5 diagrammatically illustrates one type of circuitry configuration of a respective location "reader" architecture as a receiver for "reading" location pulses or associated signals, "blink" as sometimes referred, such as emitted from a mobile station. An antenna 210 senses appended transmission bursts or other signals from a respective mobile station. The antenna, which could be omnidirectional and circularly polarized, is coupled to a power amplifier 212, whose output is filtered by a bandpass filter 214. Respective I and Q channels of the bandpass filtered signal are processed in associated circuits corresponding to that coupled downstream of filter 214. To simplify the drawing, only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communications cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output which is applied through a controlled current amplifier 237 and applied to communications cable 231 to a communications signal processor, which could be an associated processor 32,32a. The communications cable 231 also supplies DC power for the various components of the location receiver by way of an RF choke 241 to a voltage regulator 242, which supplies the requisite DC voltage for powering an oscillator, power amplifier and analog-to-digital units of the reader.

The amplitude of the (175 MHZ) reference frequency supplied by the communications control processor to the phase locked local oscillator 227 implies the length of any communications cable 231 (if used) between the processor and the reader. This magnitude information can be used as control inputs to an equalizer 236 and current amplifier 237, so as to set gain and/or a desired value of equalization, which may be required to accommodate any length of a communication cable. For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 6:
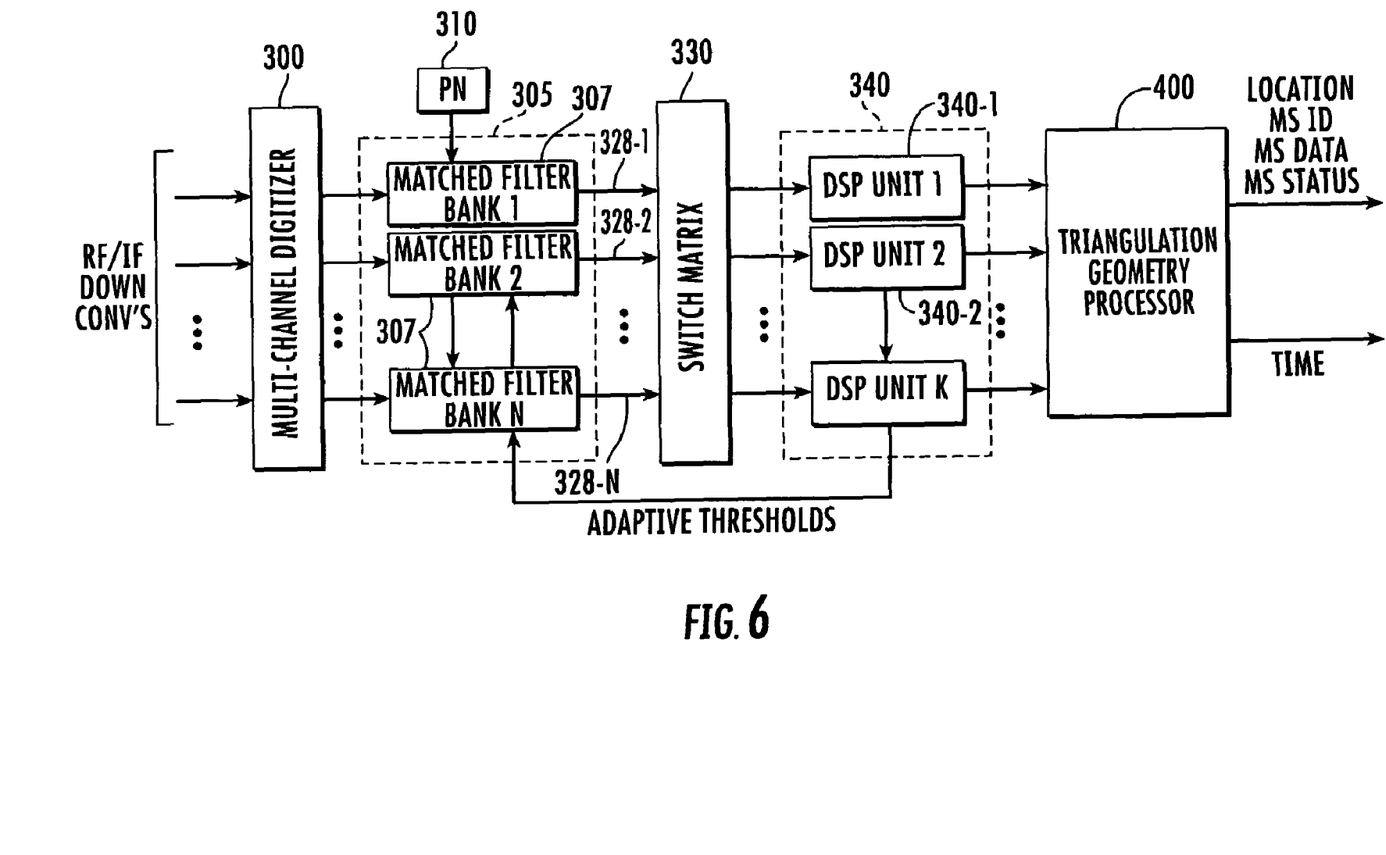
FIG. 6 is another high-level block diagram of an example of the circuit architecture that can be used as modified for correlation-based signal processors and used with the receiver in accordance with a non-limiting example of the present invention.

FIG. 6 illustrates the architecture of a correlation-based, RF signal processor as part of processor to which the output of a respective RF/IF conversion circuit of FIG. 5 can be coupled for processing the output and determining location. The correlation-based RF signal processor correlates spread spectrum signals detected by its associated reader with successively delayed or offset in time (by a fraction of a chip) spread spectrum reference signal patterns, and determines which spread spectrum signal received by the reader is the first-to-arrive corresponding to a "blink" or location pulse as part of the communications signal that has traveled over the closest observable path between a mobile station and a location reader.

Because each "reader" can be expected to receive multiple signals from the mobile station, due to multipath effects caused by the signal transmitted by the mobile station being reflected off various objects/surfaces between the mobile station and the receiver, the correlation scheme ensures identification of the first observable transmission, which is the only signal containing valid timing information from which a true determination can be made of the distance from the tag to the reader.

For this purpose, as shown in FIG. 5, the RF processor employs a front-end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in commonly assigned U.S. Pat. No. 6,121,926, the disclosure which is hereby incorporated by reference in its entirety. A PN spreading code generator could produce a PN spreading code (identical to that produced by the PN spreading sequence generator of the location transmitter). The PN spreading code produced by a PN code generator is supplied to a first correlator unit and a series of delay units, outputs of which are coupled to respective ones of the remaining correlators. Each delay unit provides a delay equivalent to one-half a chip. Further details of the parallel correlation are disclosed in the '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of 'on-demand', or 'as needed' digital processing units 340-1, 340-2, . . . , 340-K. One of the correlator outputs 328 has a summation value exceeding the threshold, which delayed version of the PN spreading sequence is effectively aligned (to within half a chip time) with the incoming signal.

This signal is applied to a switching matrix 330, which is operative to couple a 'snapshot' of the data on the selected channel to a selected digital signal processing unit 340-*i* of the set of digital signal processing units 340. The mobile station can 'blink' or transmit location pulses randomly, and can be statistically quantified, and thus, the number of potential simultaneous signals over a processor revisit time could determine the number of such 'on-demand' digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

As a non-limiting example, the processor section 400 can use a standard multi-lateration algorithm that relies upon time-of-arrival inputs from at least three detectors to compute the location of the object. The algorithm may be one which uses a weighted average of the received signals. In addition to using the first observable signals to determine object location, the processor also can read any data read out of a mobile station's memory and superimposed on the transmission. Object position and parameter data can be downloaded to a database where object information is maintained. Any data stored in a mobile station memory may be augmented by altimetry data supplied from a relatively inexpensive, commercially available altimeter circuit. Further details of such circuit are disclosed in the '926 patent.

It is also possible to use an enhanced circuit as disclosed in the '926 patent to reduce multipath effects, by using dual antenna and providing spatial diversity-based mitigation of multipath signals. In such systems, the antennas of each location reader are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the processor is modified to include a front-end subroutine that selects the earlier-to-arrive outputs of each of the detector pairs as the value to be employed in the multi-lateration algorithm. A plurality of auxiliary 'phased array' signal processing paths can be coupled to the antenna set (e.g., pair), in addition to the paths containing the directly connected receivers and their associated first arrival detector units that feed the triangulation processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively 'early' signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the 'pattern' or spatial distribution of gain to receive one incoming signal and ignore the other.

The multi-lateration algorithm executed by the processor could include a front-end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in commonly assigned U.S. Pat. No. 6,127,976, the disclosure which is hereby incorporated by reference in its entirety. This architecture can be configured to distribute the workload over a plurality of interconnected information handling and processing subsystems. Distributing the processing load enables fault tolerance through dynamic reallocation.

The front-end processing subsystem can be partitioned into a plurality of detection processors, so that data processing operations are distributed among sets of detection processors. The partitioned detection processors can be coupled in turn through distributed association processors to multiple location processors. For maximum mobile station detection capability, each receiver is preferably equipped with a low cost omnidirectional antenna that provides hemispherical coverage within the monitored environment.

A detection processor filters received energy to determine the earliest time-of-arrival energy received for a transmission, and thereby minimize multi-path effects on the eventually determined location of a mobile device. The detection processor can demodulate and time stamp all received energy that is correlated to known spreading codes of the transmission, so as to associate a received location pulse with only one mobile station. It then assembles this information into a message packet and transmits the packet as a detection report over a communication framework to one of the partitioned set of association processors, and then de-allocates the detection report.

A detection processor to association control processor flow control mechanism can equitably distribute the computational load among the available association processors, while assuring that all receptions of a single location pulse transmission, whether they come from one or multiple detection processors, are directed to the same association processor.

The flow control mechanism can use an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile station (or device) to a single destination location processor, the association communication process of the communication framework may employ the same information and processing load distribution algorithm executed by the detection communication process of the communication framework. Each location processor determines the geographical location of a mobile station using the time-of-arrival measurement information originally sourced from the detection processors. The specific algorithm employed for location determination matches the number of arrival time measurements with whatever a priori information is available.

To locate a mobile station, a location processor may employ all available diversity information associated with the mobile station of interest, including, but not limited to the mobile station ID, any data contained in the transmission and metrics indicating confidence in these values. It then forwards a location report containing this information over a location communication process to an asset management database. A location estimate may be derived from the measured time-of-arrival information in a received association report packet, using a differential time-of-arrival algorithm, such as a hyperbolic geometry-based function.

It is also possible to use a wireless local area network (WLAN) spread spectrum waveform to perform the geo-location function of the present invention. The assumption is that the wireless communications signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. It is also possible to have a timing signal from a known location. Other component locations would have to be known, of course. For example, some wireless local area network (WLAN) transmitters have known locations to enable the use of the algorithm when an access point base station or mobile station location is known.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator operative as a functional spread spectrum matched filter to enable a higher quality estimate with integration over many chips of the spread spectrum transmission. It is possible to use a matched filter that spans multiple symbols and improve accuracy by collecting more energy in the filter prior to leading edge detection.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A communication system, comprising:
  a transmitter configured to generate a wireless communications signal representative of digital data by modulating the digital data using Frequency Shift Keyed (FSK) modulation, and transmit the wireless communications signal over a wireless communications channel as an FSK modulated communications signal; and
  a receiver configured to receive the FSK modulated communications signal and generate receiver output data, the receiver comprising circuitry configured to:
    convert the FSK modulated communications signal via an analog-to-digital conversion;
    determine a low tone magnitude signal and a high tone magnitude signal from the converted FSK modulated communications signal;
    generate an FSK data channel by comparing the low tone magnitude signal to the high tone magnitude signal;
    determine a low tone threshold based on the low tone magnitude via low tone peak-hold circuitry;
    generate a low tone Amplitude Shift Keyed (ASK) data channel by comparing the low tone magnitude signal with the low tone threshold;
    determine a high tone threshold based on the high tone magnitude via high tone peak-hold circuitry;
    generate a high tone Amplitude Shift Keyed (ASK) data channel by comparing the high tone magnitude signal with the high tone threshold;
    determine that data on the FSK data channel is invalid data; and
    in response to determining that the data on the FSK data channel is invalid data, process the low tone ASK data channel to generate the receiver output data or process the high tone ASK data channel to generate the receiver output data.

2. A communications system according to claim 1, and further comprising a tag transceiver used in a real-time location system in which said receiver is incorporated.

3. A communications system according to claim 1, wherein said receiver comprises a analog-to-digital (A/D) converter configured to receive and convert said FSK modulated communications signal into a digital signal.

4. A communications system according to claim 3, wherein said receiver comprises a bandpass filter connected to said A/D converter and operative as an anti-aliasing filter.

5. A communications system according to claim 1, wherein said receiver comprises an Inphase/Quadrature (I/Q) matched filter circuit configured to process the low and high tones.

6. A communications system according to claim 5, wherein said I/Q matched filter circuit comprises low tone I and Q matched filters and high tone I and Q matched filters.

7. A communications system according to claim 5, wherein said receiver comprises an adder circuit connected to said I/Q matched filter circuit configured to calculate the magnitude of the low and high tones.

8. A communications system according to claim 7, wherein said receiver comprises a compare circuit configured to receive a result of the adder circuit to generate FSK channel data.

9. A communications system according to claim 7, wherein said receiver comprises the peak-hold circuitry and a divide circuit configured to receive data from the adder circuit.

10. A communications system according to claim 1, wherein said receiver comprises an encoder configured to perform Manchester encoding of data on the low tone ASK data channel, data on the high tone ASK data channel, and data on the FSK data channel such that known signal segments are valid when expressed in Manchester periods.

11. A receiver for processing a wireless communications signal representative of digital data that has been Frequency Shift Key (FSK) modulated to generate receiver output data, the receiver comprising:
an analog-to-digital converter configured to receive the FSK modulated communications signal over a communications channel and convert the FSK modulated communications signal into a digital signal; and
circuitry configured to:
determine a low tone magnitude signal and a high tone magnitude signal from the converted FSK modulated communications signal;
generate an FSK data channel by comparing the low tone magnitude signal to the high tone magnitude signal:
determine a low tone threshold based on the low tone magnitude via low tone peak-hold circuitry;
generate a low tone Amplitude Shift Keyed (ASK) data channel by comparing the low tone magnitude signal with the low tone threshold:
determine a high tone threshold based on the high tone magnitude via high tone peak-hold circuitry;
generate a high tone Amplitude Shift Keyed (ASK) data channel by comparing the high tone magnitude signal with the high tone threshold:
determine that data on the FSK data channel is invalid data; and
in response to determining that the data on the FSK data channel is invalid data, process the low tone ASK data channel to generate the receiver output data or process the high tone ASK data channel to generate the receiver output data.

12. The receiver according to claim 11, and further comprising a tag transceiver used in real time location systems in which said receiver is incorporated.

13. The receiver according to claim 11, and further comprising an encoder configured to perform Manchester encoding of data on the low tone ASK data channel, data on the high tone ASK data channel, and data on the FSK data channel such that known signal segments are valid when expressed in Manchester periods.

14. The receiver according to claim 11, wherein the circuitry includes an I/Q matched filter circuit that comprises low tone I and Q matched filters and high tone I and Q matched filters.

15. The receiver according to claim 11, and further comprising a bandpass filter operative as an anti-aliasing filter and connected to said A/D converter.

16. A method for communicating, which comprises:
receiving a wireless communications signal representative of digital data that has been Frequency Shift Key (FSK) modulated;
converting the FSK modulated communications signal via an analog-to-digital conversion;
determining a low tone magnitude signal and a high tone magnitude signal from the converted FSK modulated communications signal;
generating an FSK data channel by comparing the low tone magnitude signal to the high tone magnitude signal;
determining a low tone threshold based on the low tone magnitude via low tone peak-hold circuitry;
generating a low tone Amplitude Shift Keyed (ASK) data channel by comparing the low tone magnitude signal with the low tone threshold;
determining a high tone threshold based on the high tone magnitude via high tone peak-hold circuitry;
generating a high tone Amplitude Shift Keyed (ASK) data channel by comparing the high tone magnitude signal with the high tone threshold;
determining that data on the FSK data channel is invalid data; and
in response to determining that the data on the FSK data channel is invalid data, processing the low tone ASK data channel to generate the receiver output data or process the high tone ASK data channel to generate the receiver output data.

17. The method according to claim 16, which further comprises converting the received FSK modulated communications signal into an digital signal.

18. The method according to claim 17, which further comprises bandpass filtering the digital signal.

19. The method according to claim 16, which further comprises processing the high and low tones within an Inphase/Quadrature (I/Q) matched filter circuit.

20. The method according to claim 16, wherein calculating the magnitude of the low tone and the high tone includes calculating the magnitude of low tone and the high tone using respective adder circuits.

21. The method according to claim 20, wherein calculating the FSK channel data includes comparing results from the adder circuits to generate the FSK channel data.

22. The method according to claim 16, which further comprises Manchester encoding data on the low tone ASK data channel, data on the high tone ASK data channel, and data on the FSK data channel such that known signal segments are valid when expressed in Manchester periods.

23. A method according to claim 16, which further comprises locating a source of the FSK modulated communication signal within a real-time location system.

24. A method according to claim 23, which further comprises incorporating the receiver into a tag transceiver.

25. The method of claim 16, further comprising utilizing a predetermined priority scheme to determine an order in which to process the data on the FSK data channel, the data on the low tone ASK data channel, and the data on the high tone ASK data channel to determine valid data.

* * * * *

UNITED STATES PATENT AND TRADEMARK OFFICE
CERTIFICATE OF CORRECTION

PATENT NO. : 8,265,191 B2
APPLICATION NO. : 11/696202
DATED : September 11, 2012
INVENTOR(S) : Bowman et al.

It is certified that error appears in the above-identified patent and that said Letters Patent is hereby corrected as shown below:

Column 14,
Line 49, "the FSK channel data" should read --FSK channel data--.

Signed and Sealed this
Second Day of April, 2013

Teresa Stanek Rea
*Acting Director of the United States Patent and Trademark Office*